(12) United States Patent
Yoon et al.

(10) Patent No.: US 9,555,796 B2
(45) Date of Patent: Jan. 31, 2017

(54) HYBRID VEHICLE HAVING INTERACTIVE MANUAL TRANSMISSION AND CONTROL METHOD THEREFOR

(71) Applicant: KOREA ADVANCED INSTITUTE OF SCIENCE AND TECHNOLOGY (KAIST), Daejeon (KR)

(72) Inventors: Yong San Yoon, Seoul (KR); Sei Bum Choi, Daejeon (KR); Kyung Soo Kim, Seoul (KR); Sun Je Kim, Mokpo (KR); Chi Woong Song, Daejeon (KR); Hee Woon Son, Nonsan (KR)

(73) Assignee: KOREA ADVANCED INSTITUTE OF SCIENCE AND TECHNOLOGY (KAIST), Daejeon (KR)

( * ) Notice: Subject to any disclaimer, the term of this patent is extended or adjusted under 35 U.S.C. 154(b) by 0 days.

(21) Appl. No.: 14/897,704

(22) PCT Filed: Jun. 12, 2014

(86) PCT No.: PCT/KR2014/005167
§ 371 (c)(1),
(2) Date: Dec. 11, 2015

(87) PCT Pub. No.: WO2014/200283
PCT Pub. Date: Dec. 18, 2014

(65) Prior Publication Data
US 2016/0107638 A1 Apr. 21, 2016

(30) Foreign Application Priority Data

Jun. 12, 2013 (KR) .......................... 10-2013-0067158

(51) Int. Cl.
*B60W 10/10* (2012.01)
*B60W 10/08* (2006.01)
(Continued)

(52) U.S. Cl.
CPC ................ *B60W 20/30* (2013.01); *B60K 6/36* (2013.01); *B60K 6/387* (2013.01); *B60K 6/46* (2013.01);
(Continued)

(58) Field of Classification Search
None
See application file for complete search history.

(56) References Cited

U.S. PATENT DOCUMENTS

2007/0275823 A1* 11/2007 Motosugi ................. B60K 6/48
477/176
2011/0009237 A1* 1/2011 Kim ........................ F16D 48/06
477/5

(Continued)

FOREIGN PATENT DOCUMENTS

JP     2003-129878     5/2003
JP     2003-335152     11/2003
(Continued)

OTHER PUBLICATIONS

International Search Report, Patent Cooperation Treaty, Sep. 4, 2014, Application No. PCT/KR2014/005167.

*Primary Examiner* — Justin Holmes
(74) *Attorney, Agent, or Firm* — Lex IP Meister, PLLC (57) ABSTRACT

A hybrid vehicle includes: an engine; a driving motor/generator connected to an output shaft of the engine; a connection unit disposed between the engine and the driving motor/generator to separate the engine from the driving motor/generator when the engine is stopped and to connect the engine to the driving motor/generator when the engine is operated; a manual transmission connected to the driving motor/generator, for directly varying gear ratio without using an engine clutch according to a driving speed and a torque generated by the driving motor/generator and/or the engine; a position sensor for detecting a position of a manual (Continued)

gearshift lever; and a central control unit connected to the engine, the driving motor/generator, the connection unit, and the manual transmission. In order to perform a gearshift of the manual transmission, the central control unit separates the connection unit disposed between the engine and the driving motor/generator when the vehicle is stopped or driven at a preset speed or lower or connects the connection unit when the vehicle is driven at the preset speed or higher, and controls the driving motor/generator and/or the engine according to the detected position of the manual gearshift lever to adjust a speed of an input shaft of the manual transmission.

14 Claims, 4 Drawing Sheets (51) Int. Cl.
*B60W 20/00* (2016.01)
*B60W 10/11* (2012.01)
*B60W 30/19* (2012.01)
*B60K 6/36* (2007.10)
*B60K 6/387* (2007.10)
*B60K 6/46* (2007.10)
*B60K 6/54* (2007.10)
*B60W 10/02* (2006.01)
*B60W 10/06* (2006.01)
*B60W 50/14* (2012.01)

(52) U.S. Cl.
CPC .............. *B60K 6/54* (2013.01); *B60W 10/02* (2013.01); *B60W 10/06* (2013.01); *B60W 10/08* (2013.01); *B60W 10/10* (2013.01); *B60W 10/11* (2013.01); *B60W 20/10* (2013.01); *B60W 30/19* (2013.01); *B60W 50/14* (2013.01); *B60W 2050/143* (2013.01); *B60W 2510/101* (2013.01); *B60W 2520/04* (2013.01); *B60W 2540/04* (2013.01); *B60W 2540/16* (2013.01); *B60W 2710/021* (2013.01); *B60W 2710/0666* (2013.01); *B60W 2710/083* (2013.01); *B60W 2710/1005* (2013.01); *B60W 2710/1011* (2013.01); *B60Y 2200/92* (2013.01); *B60Y 2300/188* (2013.01); *B60Y 2300/42* (2013.01); *B60Y 2300/70* (2013.01); *B60Y 2400/71* (2013.01); *B60Y 2400/76* (2013.01); *Y10S 903/909* (2013.01); *Y10S 903/914* (2013.01); *Y10S 903/93* (2013.01)

(56) References Cited

U.S. PATENT DOCUMENTS

| | | | |
|---|---|---|---|
| 2013/0124027 A1* | 5/2013 | Tanishima | B60K 6/48 701/22 |
| 2013/0166130 A1* | 6/2013 | Suzuki | B60K 6/48 701/22 |
| 2013/0218394 A1* | 8/2013 | Kanayama | B60K 6/442 701/22 |

FOREIGN PATENT DOCUMENTS

| | | |
|---|---|---|
| JP | 2012-187962 | 10/2012 |
| KR | 10-2001-0008640 | 2/2001 |

* cited by examiner

HYBRID VEHICLE HAVING INTERACTIVE MANUAL TRANSMISSION AND CONTROL METHOD THEREFOR

BACKGROUND OF THE INVENTION

1. Field of the Invention

The present invention relates to a hybrid vehicle and a method of controlling the same, and more particularly to a hybrid vehicle having a manual transmission and a method of controlling the same.

2. Description of the Prior Art

Korean Patent Application Publication No. 2011-0119330 discloses a gearshift apparatus using a differential/planetary gear unit instead of a clutch, a method of controlling the same, and a vehicle using the same.

However, because the gearshift apparatus without employing a clutch uses a differential/planetary gear unit, it may cause a gear engagement loss of about 3% and fails to suggest a detailed measure for gear stages which can be newly connected when a manual transmission is gearshifted.

SUMMARY OF THE INVENTION

Accordingly, the present invention provides a hybrid vehicle which can minimize loss of energy and reduce manufacturing costs of the vehicle.

The present invention also provides a method of controlling the above-described hybrid vehicle.

Meanwhile, the objects of the present invention are not limited to the above-mentioned ones, and can be variously expanded without departing from the spirit and areas of the present invention.

In accordance with an aspect of the present invention, there is provided a hybrid vehicle including: an engine; a driving motor/generator connected to an output shaft of the engine; a connection unit disposed between the engine and the driving motor/generator to separate the engine from the driving motor/generator when the engine is stopped and to connect the engine to the driving motor/generator when the engine is operated; a manual transmission connected to the driving motor/generator, for directly varying gear ratio without using an engine clutch according to a driving speed and a torque generated by the driving motor/generator and/or the engine; a position sensor for detecting a position of a manual gearshift lever; and a central control unit connected to the engine, the driving motor/generator, the connection unit, and the manual transmission, for in order to perform a gearshift of the manual transmission, separating the connection unit disposed between the engine and the driving motor/generator when the vehicle is stopped or driven at a preset speed or lower or connecting the connection unit when the vehicle is driven at the preset speed or higher, and controlling the driving motor/generator and/or the engine according to the detected position of the manual gearshift lever to adjust a speed of an input shaft of the manual transmission.

When the vehicle is stopped or driven at the preset speed or lower, power from the engine may be interrupted and the vehicle is driven by the driving motor/generator.

When the vehicle is driven at the preset speed or higher, the vehicle may be driven by the engine and the driving motor/generator.

The connection unit may include at least one selected from the group consisting of a synchromesh mechanism, a dog clutch, a one-way clutch, and an engine clutch.

The hybrid vehicle may further include a gearshift trigger switch connected to the central control unit, and a driver may transmit a trigger signal for a gearshift operation of the vehicle to the central control unit through the gearshift trigger switch.

The central control unit may control torques of the engine and the driving motor/generator according to a trigger signal for the gearshift operation.

The hybrid vehicle may further include speed sensors installed in an output shaft of the engine, an input shaft of the manual transmission, and an output shaft of the manual transmission.

The central control unit may inform a driver of a target gear when it is necessary to change a gear of the manual transmission.

The central control unit may send the driver an alarm message when the driver does not connect to the target gear.

In accordance with another aspect of the present invention, there is provided a method of controlling a hybrid vehicle, the method including: in order to perform a gearshift of a manual transmission of the vehicle, separating a connection unit disposed between an engine and a driving motor/generator when the vehicle is stopped or driven at a preset speed or lower or connecting the connection unit when the vehicle is driven at the preset speed or higher; detecting a desired gear stage of a driver through a position sensor of a manual gearshift lever; controlling the driving motor/generator and/or the engine based on the detected gear stage to adjust a speed of an input shaft of the manual transmission connected to the driving motor/generator; and changing a gear of the manual transmission to a desired gear stage of the driver.

The controlling of the driving motor/generator and/or the engine may include: when the vehicle is stopped or driven at a preset speed or lower, interrupting power from the engine and driving the driving motor/generator; and when the vehicle is driven at the present speed or higher, driving the driving motor/generator and the engine.

The connection unit may include at least one selected from the group consisting of a synchromesh mechanism, a dog clutch, a one-way clutch, and an engine clutch.

The method may further include inputting a trigger signal for a gearshift operation of the vehicle through a gearshift trigger switch by the driver.

The method may further include controlling torques of the engine and the driving motor/generator according to a trigger signal for the gearshift operation.

As described above, the hybrid vehicle driven by the manual transmission according the present invention does not employ a planetary gear which causes loss of power of 3% but introduces a connection unit for interrupting the engine from the driving unit to prevent the engine from being stopped at a low speed, and when the engine is connected to the driving unit, the driving motor/generator and the engine may be controlled at the same time. That is, when a new gearshift gear of the manual transmission is to be connected, the driver moves the gearshift lever and the position sensor detects a position of the gearshift lever to inform the central control unit of the gear stage of the transmission, which is to be connected newly, so that the engine and the driving motor/generator can be controlled at the same time to adjust an engaging speed of the synchronizing unit (for example, a synchromesh mechanism), enabling smooth connection of the new gear stage.

Further, loss of energy by the transmission can be minimized by using the manual transmission, and the driving motor/generator can be operated in an optimum situation even in an electric mode to minimize loss of energy by locating the driving motor/generator in front of the transmission. In addition, loss of energy can be minimized and a gearshift operation can be smoothly performed by eliminating a planetary gear which is a problem when the existing gear transmission is used.

Meanwhile, the objects of the present invention are not limited to the above-mentioned ones, and can be variously expanded without departing from the spirit and areas of the present invention.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Specific structural or functional descriptions of the embodiments of the present invention disclosed in the specification are exemplified for the purpose of describing the embodiments of the present invention only, and the embodiments of the present invention may be carried out in various forms and should not be construed to limit the embodiments described herein.

In the present invention, various modifications may be applied and various forms may be realized, and thus specific embodiments will be exemplified in the drawings and be described in detail in the specification. However, the present invention is not intended to specific disclosure forms, and it will be appreciated that the present invention includes all changes, equivalents, or replacements included in the spirit and technical range of the present invention.

When it is mentioned that a certain element is "connected to" or "electrically connected to" a second element, the first element may be directly connected or electrically connected to the second element, but it should be understood that a third element may intervene therebetween. On the other hand, when it is mentioned that a certain element is "directly connected to" or "directly electrically connected to" a second element, it should be understood that there is no third element therebetween. The other expressions for describing a relationship between constituent elements such as "between" and "directly between, or "adjacent to" and "directly adjacent to" are construed in the same way.

The terms used in the application are used to describe specific embodiments only, and it not intended to limit the present invention. A singular expression includes a plural expression as long as they are clearly distinguished in the context. In the application, it should be understood that the terms such as "comprising", "including" are intended to express that features, numbers, steps, operations, constituent elements, part, or combinations thereof described in the specification are present and do not exclude existence or additions of one or more other features, numbers, steps, operations, constituent elements, part, or combinations thereof.

Unless defined in a different way, all the terms used herein including technical and scientific terms have the same meanings as understood by those skilled in the art to which the present invention pertains. Such terms as defined in generally used dictionaries should be construed to have the same meanings as those of the contexts of the related art, and unless clearly defined in the application, they should not be construed to have ideally or excessively formal meanings.

Hereinafter, exemplary embodiments of the present invention will be described in detail with reference to the accompanying drawings. The same constituent elements in the drawings are denoted by the same reference numerals, and a repeated description of the same elements will be omitted.

Figure 1:
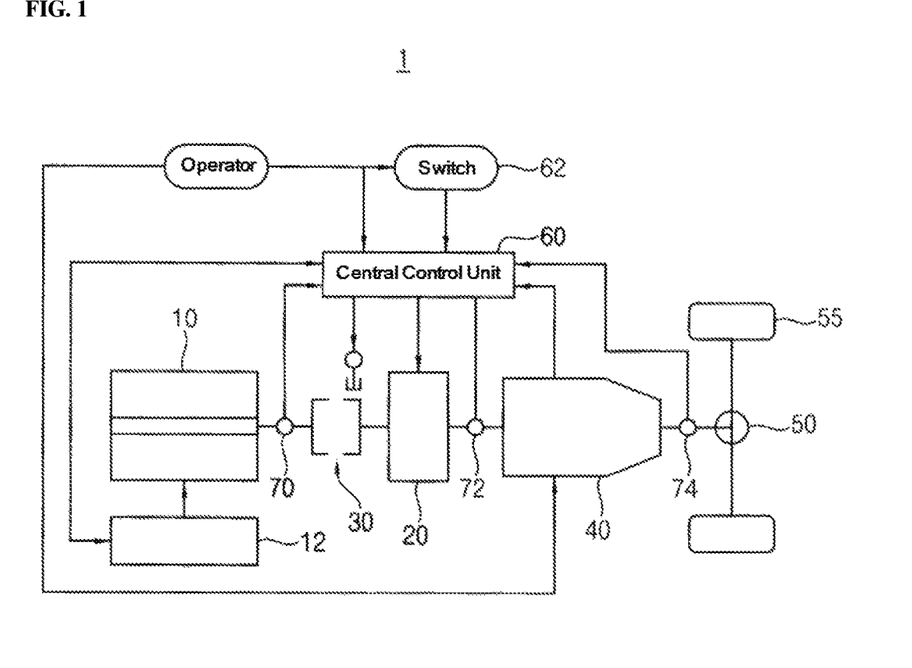
FIG. 1 is a block diagram showing a hybrid vehicle according to an exemplary embodiment of the present invention.

FIG. 1 is a block diagram showing a hybrid vehicle according to an exemplary embodiment of the present invention.

Referring to FIG. 1, the hybrid vehicle 1 may include an engine, a driving motor/generator 20, a connection unit 30 disposed between the engine 10 and the driving motor/generator 20, a manual transmission connected to the driving motor/generator 20, and a central control unit 60 connected to the engine 10, the driving motor/generator 20, the connection unit 30, and the manual transmission 40.

In the exemplary embodiment, the engine 10 may be driven by using gas, gasoline, or diesel. The engine 10 may be started by a start motor 12. The driving motor/generator 20 may be driven by a current of a power storage unit (not shown). Here, the driving motor/generator 20 may generate electric power when it is necessary to brake the vehicle or the stored electric power is insufficient.

The connection unit 30 is interposed between the engine 10 and the driving motor/generator 20 to transmit or interrupt power between the engine 10 and the driving motor/generator 20. For example, the connection unit 30 may include a connection unit such as a synchromesh mechanism, a dog clutch, a one-way clutch, and an engine clutch.

The manual transmission 40 may be connected to the driving motor/generator 20 to vary gear ratio according to a driving speed and a torque generated by the driving motor/generator 20 and/or the engine 10. Accordingly, the manual transmission 40 may synthesize power input from the engine 10 and/or the driving motor/generator 20 to output the synthesized power to a tire wheel 55 via a differential gear.

According to the exemplary embodiment, a power train of the hybrid vehicle 1 may have two or more driving modes according to connection states of the connection unit 30. That is, the modes of the hybrid vehicle 1 include an electric mode in which the engine 10 is separated and only the driving motor/generator 20 is driven while the connection unit 30 is separated (released), an engine turbo mode in which both the engine 10 and the driving motor/generator 20 are driven while the connection unit is connected (coupled), and an engine mode in which the driving motor/generator 20 are operated as a generator. Further, the modes of the hybrid vehicle 1 may include a generation mode in which the vehicle is not driven but the engine 10 drives the driving motor/generator 20 to generate electric power, and a regenerative mode in which the engine 10 does not contribute to power and the driving motor/generator 20 performs regenerative braking.

The central control unit 60 may collect and analyze information input through a network and control an overall behavior of the hybrid vehicle. Specifically, the central control unit 60 is connected to the engine 10, the driving motor/generator 20, the connection unit 30, and the manual transmission 40 through a network to control a gearshift of the hybrid vehicle 1. The central control unit 60 may collect information necessary for a gearshift for changing the speed of the vehicle. For example, the sensors may include an engine speed sensor 70 for detecting a rotating speed of the engine 10, a transmission input rotation sensor 72 for detecting a rotating speed of an input shaft of the manual transmission 40, and a transmission output rotation sensor 74 for detecting a rotation speed of an output shaft of the manual transmission 40.

In the exemplary embodiment, the hybrid vehicle 1 may further includes a gearshift trigger switch 62 connected to the central control unit 60. The driver may press the transmission trigger switch 62 to transmit a trigger signal for an gearshift operation of the vehicle to the central control unit 60. For example, the transmission trigger switch 62 may include a gear up switch 64 (see FIG. 3) and a gear down switch 66 (see FIG. 3). Accordingly, the driver may trigger a gearshift operation for increasing a gear stage by pressing the gear up switch 64 or trigger a gearshift operation for decreasing a gear stage by pressing the gear down switch 66. The central control unit 60 may receive driving information such as a displacement of an accelerator pedal operated by the driver and an on/off operation of a brake pedal, as well as a trigger signal for a gearshift operation.

Hereinafter, a method of controlling a gearshift of the hybrid vehicle of FIG. 1 will be described.

Figure 2:
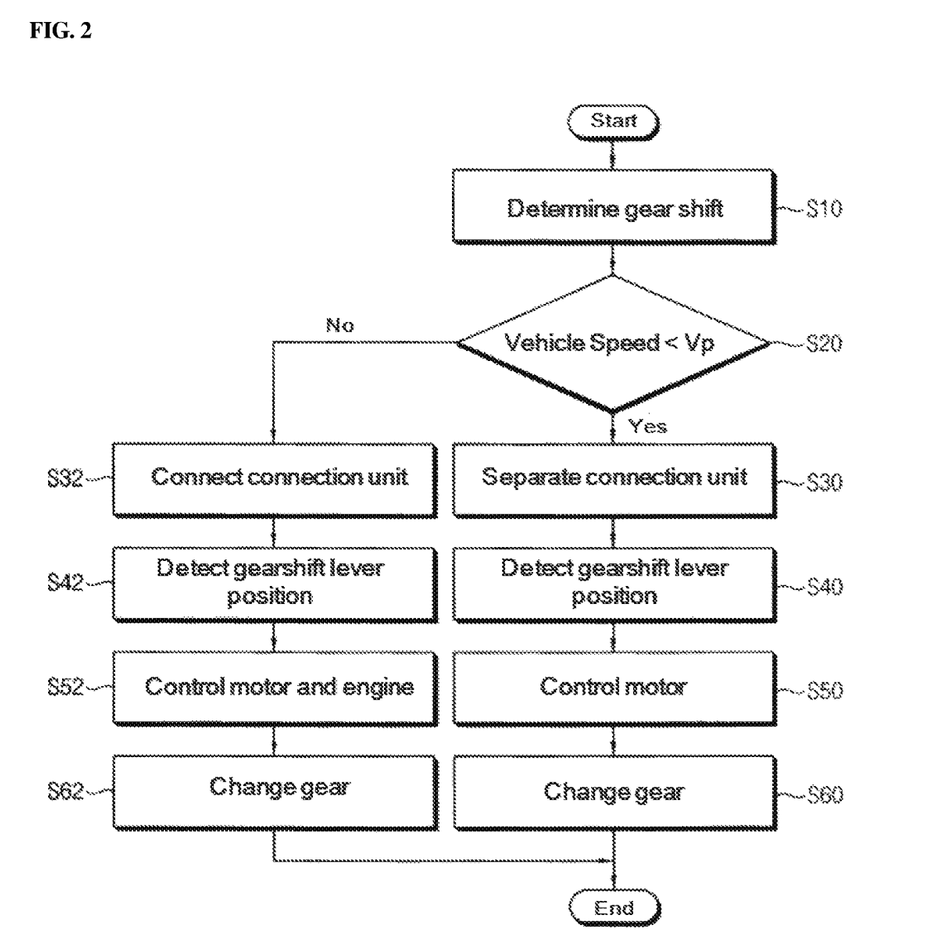
FIG. 2 is a flowchart showing a method of controlling a hybrid vehicle according to an exemplary embodiment of the present invention.
Figure 3:
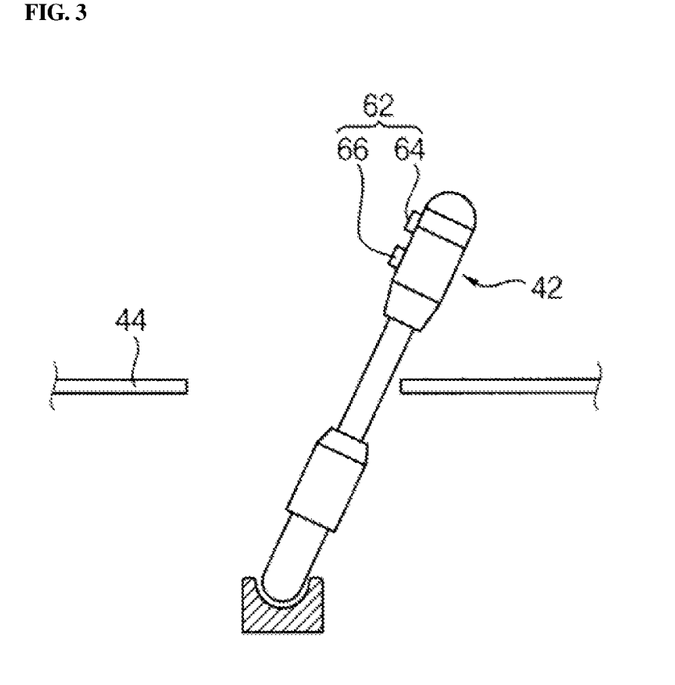
FIG. 3 is a view showing a part of a gearshift lever apparatus connected to a manual transmission according to an exemplary embodiment of the present invention.
Figure 4:
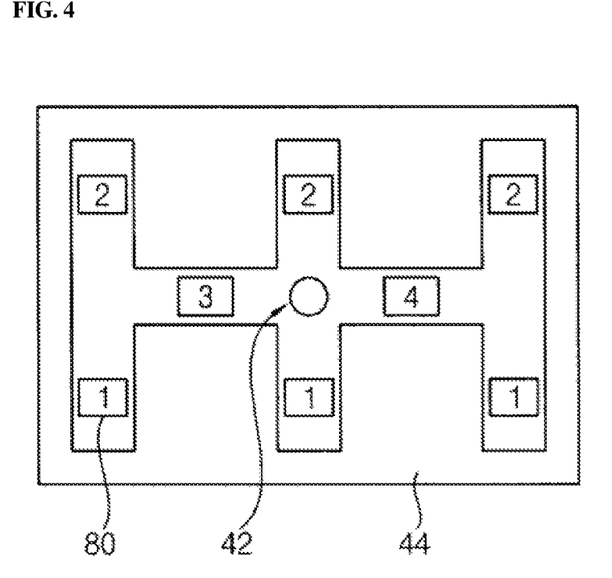
FIG. 4 is a plan view showing a gearshift guide used in the gearshift lever apparatus of FIG. 3.

FIG. 2 is a flowchart showing a method of controlling a hybrid vehicle according to an exemplary embodiment of the present invention. FIG. 3 is a view showing a part of a gearshift lever apparatus connected to a manual transmission according to an exemplary embodiment of the present invention. FIG. 4 is a plan view showing a gearshift guide used in the gearshift lever apparatus of FIG. 3.

Referring to FIGS. 1 to 4, first, it may be determined whether it is necessary to change a gearshift stage of the manual transmission 40 in a stated vehicle (S10).

For example, the central control unit 60 may inform the driver that a gearshift is necessary through vehicle speed and driving information. The driver may transmit a trigger signal for a gear shifting operation of the vehicle to the central control unit 60 through the transmission trigger switch 62. As shown in FIG. 3, the driver may trigger a gearshift operation of increasing or decreasing a gear stage by pressing the gear up switch 64 or the gear down switch 66 of the gearshift trigger switch 62 installed in the gearshift lever 42.

After receiving a gearshift trigger signal from the gearshift trigger switch 62, the central control unit 60 may compare the speed of the vehicle with a preset speed to determine whether the connection unit 30 interposed between the engine 10 and the driving motor/generator 20 is to be separated (S20). In addition, after receiving the gearshift trigger signal, the central control unit 60 may make a control to reduce power of the engine 10 and power of the driving motor/generator 20.

When the vehicle is stopped or driven at a preset speed or lower, the connection unit 30 disposed between the engine 10 and the driving motor/generator 20 may be separated (S30). Because the engine 10 is not used when the vehicle is stopped or driven at a low speed (for example, at 5 km/h or lower), the connection unit 30 is separated to interrupt power from the engine and the vehicle is driven only by the driving motor/generator 20.

Thereafter, if the driver moves the gearshift lever 42 to a specific gear stage, a position sensor 80 may detect a position of the gearshift lever 42 to forward the detected position to the central control unit 60.

As shown in FIGS. 3 and 4, if the driver moves the manual gearshift lever 42 to a desired gear stage, the position sensor 80 may detect a position of the gearshift lever 42 and inform the central control unit 60 of the detected position. In the embodiment, the position sensor 80 may include a plurality of Hall sensors installed at locations of a gearshift guide 44 in correspondence to the moved position of the gearshift lever 42. If the driver moves the gearshift lever 42 to a desired gear stage, the Hall sensors may recognize a combination of specific pulse signals generated according to a change of the position of the gearshift lever 42 (for example, a combination of first and fourth pulses) to detect a position of the gearshift lever 42. It will be appreciated that the position sensor 80 according to the embodiment of the present invention includes a Hall sensor, but may be another type of sensor which can detect a position of the gearshift lever 42.

Thereafter, the central control unit 60 may control the driving motor/generator 20 to adjust a speed of an input shaft of the manual transmission 40 connected to the driving motor/generator 20 (S50), and the driver may finish a manual gear manipulation to change the gear of the manual transmission 40 to a target gear (S60).

For example, when the driver intends to move the gearshift lever 42 to a new gear stage to connect a gear, a gear is not connected because it is not synchronized yet, and if the sensor detects a position of the lever and informs the central control unit 60 of the detected position in this state, the central control unit 60 may control the driving motor/generator 20 to synchronize the gear, which is to be connected. If the synchronization is completed, the driver is informed of the fact and pushes the gearshift lever 42 to complete connection of the gear.

If the vehicle is driven at the preset speed or higher, the connection unit 30 disposed between the engine 10 and the driving motor/generator 20 may be connected (S32). Then, when the engine 10 is stopped, it may be started first. For example, in order to connect the connection unit 30, the driver moves the gearshift lever 42 to a neutral position, and controls a speed of the driving motor/generator 20 to smoothly connect the connection unit 30 in correspondence to the engagement speed of the connection unit 30.

If the driver informs the central control unit 60 by pressing a gearshift trigger switch 62 to increase a gear stage, the central control unit 60 may inform the driver of a target gear to lessen a torque of the engine 10, and if the driver moves the gearshift lever 42 to a new gear stage position, the position sensor 80 may detect a position of the gearshift lever 42 and forward the detected position to the central control unit 60 (S42).

Thereafter, the central control unit 60 may control the driving motor/generator 20 and the engine 10 at the same time, and the driver may finish a manual gear manipulation to completely change the gear of the manual transmission 40 to a target gear (S62). Then, when the driver fails to connect the gear to the target gear, the central control unit 60 may send an alarm message to the driver.

In an operation process of the hybrid vehicle 1, the speed of the vehicle increases to a predetermined lever or higher in an electric mode when the vehicle is stopped, and then if a gearshift is necessary, the gearshift trigger switch 62 is manually operated to transmit a gearshift trigger signal to the central control unit 60. In addition, after receiving the gearshift trigger signal, the central control unit 60 may reduce power of the engine 10 and power of the driving motor/generator 20. Thereafter, if the driver manually moves a gearshift gear of the connected manual transmission 40 to a new gear stage, the position sensor 80 detects the position and informs the central control unit 60 of the position, and the central control unit 60 controls power of the engine 10 and/or the driving motor/generator 20 to adjust a speed of the input shaft of the manual transmission 40 in correspondence to engagement of a target gear, which is to be connected newly, and the driver engages a new target gearshift gear.

As described above, because a planetary gear is not used, the engine 10 should be interrupted from the driving unit and the vehicle should be driven only by the driving motor/generator 20 to prevent the engine 10 from being stopped.

If the speed of the vehicle is a predetermined level or higher, the engine 10 may be connected to the driving unit, and the central control unit 60 controls the driving motor/generator 20 and the engine 10 at the same time to satisfy an engaging speed of the new gearshift gear. If the driver is informed of a gear stage, which is to be engaged, the driver manually manipulates the gear to a correct gear stage.

Connection units such as a synchromesh mechanism, a dog clutch, a one-way clutch, and an engine clutch may be introduced to connect and separate the engine 10 to and from the engine 10 if necessary, but their functions are totally different from that of an existing engine clutch. The existing engine clutch is adapted to lessen an impact when a new gear shift gear is engaged and the connection unit according to the present invention is adapted to separate an engine from a driving unit when the engine is not used, and it will be appreciated that their in-use timings and numbers are significantly different when the vehicles are driven.

As described above, the hybrid vehicle driven by the manual transmission according to the exemplary embodiment of the present invention does not employ a planetary gear which causes loss of power of 3% but introduces a connection unit for interrupting the engine from the driving unit to prevent the engine from being stopped at a low speed, and when the engine is connected to the driving unit, the driving motor/generator and the engine may be controlled at the same time. That is, when a new gearshift gear of the manual transmission is to be connected, the engine and the driving motor/generator may be controlled at the same time such that the new gear stage can be smoothly connected by adjusting engaging speeds of the synchronizing units of the two gears.

Further, loss of energy by the transmission can be minimized by using the manual transmission, and the driving motor/generator can be operated in an optimum situation even in an electric mode to minimize loss of energy by locating the driving motor/generator in front of the transmission. In addition, loss of energy can be minimized and a gearshift operation can be smoothly performed by eliminating a planetary gear which is a problem when the existing gear transmission is used.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A hybrid vehicle comprising:
    an engine;
    a driving motor/generator connected to an output shaft of the engine;
    a connection unit disposed between the engine and the driving motor/generator to separate the engine from the driving motor/generator when the engine is stopped and to connect the engine to the driving motor/generator when the engine is running;
    a manual transmission connected to the driving motor/generator, for directly varying the gear ratio without using an engine clutch, according to a driving speed and a torque generated by the driving motor/generator and the engine;
    a position sensor for detecting a moving direction of a manual gearshift lever; and
    a central control unit connected to the engine, the driving motor/generator, the connection unit, and the manual transmission, for in order to assist a gearshift of the manual transmission, separating the connection unit disposed between the engine and the driving motor/generator when the vehicle is stopped or driven at a speed lower than a preset speed, or connecting the connection unit when the vehicle is driven at the preset speed or higher, and controlling the driving motor/generator and the engine according to the moving direction of the manual gearshift lever detected by the position sensor to adjust a speed of an input shaft of the manual transmission; and
    a gearshift trigger switch connected to the central control unit,
    wherein a driver transmits a trigger signal for a gearshift operation of the vehicle to the central control unit through the gearshift trigger switch.

2. The hybrid vehicle of claim 1, wherein when the vehicle is stopped or driven at the speed lower than the preset speed, power from the engine is interrupted and the vehicle is driven by the driving motor/generator.

3. The hybrid vehicle of claim 1, wherein when the vehicle is driven at the preset speed or higher, the vehicle is driven by the engine and the driving motor/generator.

4. The hybrid vehicle of claim 1, wherein the connection unit comprises at least one selected from the group consisting of a synchromesh mechanism, a dog clutch, and a one-way clutch.

5. The hybrid vehicle of claim 1, wherein the central control unit controls torques of the engine and the driving motor/generator according to a trigger signal for the gearshift operation.

6. The hybrid vehicle of claim 1, further comprising speed sensors installed in an output shaft of the engine, an input shaft of the manual transmission, and an output shaft of the manual transmission.

7. The hybrid vehicle of claim 1, wherein a desired gear is informed by the central control unit when it is necessary to change a gear of the manual transmission.

8. The hybrid vehicle of claim 7, wherein an alarm message is provided by the central control unit when the desired gear is not connected to the driver.

9. A method of controlling a hybrid vehicle, the method comprising:
    inputting a trigger signal for a gearshift operation of the vehicle through a gearshift trigger switch by a driver in order to assist a gearshift of a manual transmission of the vehicle, separating a connection unit disposed between an engine and a driving motor/generator when the vehicle is stopped or driven at a speed lower than a preset speed or connecting the connection unit when the vehicle is driven at the preset speed or higher;

detecting a desired gear stage of a driver through a position sensor of a manual gearshift lever;

controlling the driving motor/generator and the engine based on the desired gear stage detected by the position sensor, to adjust the speed of an input shaft of the manual transmission connected to the driving motor/generator; and letting the manual transmission be ready to be engaged to a desired gear stage by the driver.

10. The method of claim 9, wherein the controlling of the driving motor/generator and the engine comprises:

when the vehicle is stopped or driven at a speed lower than the preset speed, interrupting power from the engine and driving the driving motor/generator; and when the vehicle is driven at the present speed or higher, driving the driving motor/generator and the engine.

11. The method of claim 9, wherein the connection unit comprises at least one selected from the group consisting of a synchromesh mechanism, a dog clutch, and an one-way clutch.

12. The method of claim 9, further comprising controlling torques of the engine and the driving motor/generator according to a trigger signal for the gearshift operation.

13. A hybrid vehicle comprising:

an engine;

a driving motor/generator connected to an output shaft of the engine;

a connection unit disposed between the engine and the driving motor/generator to separate the engine from the driving motor/generator when the engine is stopped and to connect the engine to the driving motor/generator when the engine is running;

a manual transmission connected to the driving motor/generator, for directly varying the gear ratio without using an engine clutch, according to a driving speed and a torque generated by the driving motor/generator and the engine;

a position sensor for detecting a moving direction of a manual gearshift lever when the manual gearshift lever is operated by a driver; and a central control unit connected to the engine, the driving motor/generator, the connection unit, and the manual transmission, for in order to assist a gearshift of the manual transmission, separating the connection unit disposed between the engine and the driving motor/generator when the vehicle is stopped or driven at a speed lower than a preset speed, or connecting the connection unit when the vehicle is driven at the preset speed or higher, and controlling the driving motor/generator and the engine to adjust a speed of an input shaft of the manual transmission according to the moving direction of the manual gearshift lever detected by the position sensor.

14. A method of controlling a hybrid vehicle, the method comprising:

in order to assist a gearshift of a manual transmission of the vehicle, separating a connection unit disposed between an engine and a driving motor/generator when the vehicle is stopped or driven at a speed lower than a preset speed or connecting the connection unit when the vehicle is driven at the preset speed or higher;

detecting a desired gear stage through a position sensor when a manual gearshift lever is operated by a driver;

controlling the driving motor/generator and the engine based on the desired gear stage detected by the position sensor, to adjust a speed of an input shaft of the manual transmission connected to the driving motor/generator; and letting the manual transmission be ready to be engaged to the desired gear stage by the driver.

* * * * *